(12) United States Patent
Horii et al.

(10) Patent No.: US 10,458,354 B2
(45) Date of Patent: Oct. 29, 2019

(54) KNOCK DETECTING DEVICE

(71) Applicant: HITACHI AUTOMOTIVE SYSTEMS, LTD., Hitachinaka-shi, Ibaraki (JP)

(72) Inventors: Tomoaki Horii, Hitachinaka (JP); Shingo Kimura, Hitachinaka (JP); Kenji Takada, Hitachinaka (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 94 days.

(21) Appl. No.: 15/547,968

(22) PCT Filed: Jan. 29, 2016

(86) PCT No.: PCT/JP2016/052564
§ 371 (c)(1),
(2) Date: Aug. 1, 2017

(87) PCT Pub. No.: WO2016/125687
PCT Pub. Date: Aug. 11, 2016

(65) Prior Publication Data
US 2018/0017004 A1 Jan. 18, 2018

(30) Foreign Application Priority Data

Feb. 5, 2015 (JP) ................................ 2015-020816

(51) Int. Cl.
*F02D 41/14* (2006.01)
*F02D 35/02* (2006.01)
(Continued)

(52) U.S. Cl.
CPC ....... *F02D 41/1498* (2013.01); *F02D 35/027* (2013.01); *F02D 37/02* (2013.01);
(Continued)

(58) Field of Classification Search
CPC ............. F02D 41/1498; F02D 41/2438; F02D 41/2451; F02D 41/402–405; F02D 35/027
(Continued)

(56) References Cited

U.S. PATENT DOCUMENTS

2005/0241369 A1* 11/2005 Inoue .................... G01L 23/225
73/35.09
2012/0296558 A1* 11/2012 Ono ........................ F02P 5/152
701/111

FOREIGN PATENT DOCUMENTS

JP 2005-299579 A 10/2005
JP 2006-207491 A 8/2006
(Continued)

*Primary Examiner* — Erick R Solis
*Assistant Examiner* — Robert A Werner
(74) *Attorney, Agent, or Firm* — Foley & Lardner LLP

(57) ABSTRACT

Provided is a knock detecting device capable of ensuring knock detection accuracy irrespective of fuel injection conditions even when a period during which injection-valve noise occurs overlaps with a knock determination period. An ECU 9 subjects signals output from a knock sensor, which detects vibrations of an internal combustion engine, to frequency analysis to calculate frequency components (501). The ECU 9 calculates a background level that indicates the average of the frequency components (503). The ECU 9 stores, in association with each other, the number of fuel injections, which indicates the number of fuel injections in a predetermined time period during one combustion cycle, with a learning value, which indicates a frequency-component correction amount (507). The ECU 9 determines the presence or absence of a knock (504) on the basis of a knock index, which indicates the ratio of the difference between each frequency component and the learning value corresponding to the number of fuel injections, to the background level (503).

12 Claims, 6 Drawing Sheets

(51) Int. Cl.
      *F02D 41/24*       (2006.01)
      *F02D 41/40*       (2006.01)
      *F02P 5/152*       (2006.01)
      *F02D 37/02*       (2006.01)
      *F02D 41/26*       (2006.01)

(52) U.S. Cl.
      CPC ..... *F02D 41/2438* (2013.01); *F02D 41/2451* (2013.01); *F02D 41/40* (2013.01); *F02D 41/402* (2013.01); *F02P 5/152* (2013.01); *F02D 41/26* (2013.01); *Y02T 10/44* (2013.01)

(58) Field of Classification Search
      USPC ......... 701/103, 104, 111; 73/114.02, 114.07; 123/299, 406.29, 406.34, 406.36–406.37
      See application file for complete search history.

(56) References Cited

FOREIGN PATENT DOCUMENTS

| | | |
|---|---|---|
| JP | 2006-307709 A | 11/2006 |
| JP | 2009-052466 A | 3/2009 |
| JP | 2009-085013 A | 4/2009 |
| JP | 2012-154228 A | 8/2012 |
| JP | 2012-241554 A | 12/2012 |
| JP | 2013-015105 A | 1/2013 |

\* cited by examiner

KNOCK DETECTING DEVICE

TECHNICAL FIELD

The present invention relates to a knock detecting device.

BACKGROUND ART

Recently, knock detecting devices that can be used in multiple-stage injection or split injection have been known (for example, see PTL 1). The knock detecting device according to PTL 1 sets a knock determination period to be a base on the basis of an engine ignition time, sets a mask period in accordance with the off-timing of a rear-stage injection of the split injection, and determines whether a knock occurs in a final knock determination period reflecting the mask period. This technique is to separate the on-off-valve noise of the fuel injection valve and the knock by masking the off-timing of the fuel injection from the knock determination period.

Another known knock detecting device (for example, see PTL 2) learns the intensity of the on-off-valve noise caused by the operation of the fuel injection valve when the knock does not occur, calculates a knock determination value on the basis of a learning value of the intensity of the on-off-valve noise, and performs the knock determination.

CITATION LIST

Patent Literature

PTL 1: Japanese Patent Application Laid-Open No. 2006-207491
PTL 2: Japanese Patent Application Laid-Open No. 2013-15105

SUMMARY OF INVENTION

Technical Problem

In the technique as disclosed in PTL 1, in order to improve the knock detection accuracy, the off-timing of the fuel injection is masked from the knock determination period so that the injection-valve noise occurring period by the operation of the fuel injection valve does not overlap with the knock determination period. Therefore, the knock that occurs in the mask period cannot be detected.

On the other hand, in the technique as disclosed in PTL 2, in order to improve the knock detection accuracy, the on-off-valve noise caused by the operation of the fuel injection valve when the knock does not occur is learned and based on the learning value, the knock determination value is calculated. However, the switching of the learning value depending on the condition of the fuel injection is not performed.

Here, the intensity of the on-off-valve noise of the fuel injection valve is different depending on the number of multiple-stage injections or cylinders. That is to say, the technique as disclosed in PTL 2 cannot ensure the equivalent knock detection accuracy in various conditions.

An object of the present invention is to provide a knock detecting device that can ensure the knock detection accuracy irrespective of fuel injection conditions even when a period during which injection-valve noise occurs overlaps with a knock determination period.

Solution to Problem

In order to solve the above issue, the present invention includes: a first calculation unit that calculates frequency components by subjecting signals output from a knock sensor, which detects vibrations of an internal combustion engine, to frequency analysis; a second calculation unit that calculates a background level expressing an average of the frequency components; a storage unit that stores the number of fuel injections expressing the number of times of injecting fuel in a predetermined period in one combustion cycle and a learning value expressing a correction amount of the frequency components while associating both the number of fuel injections and the learning value; and a knock determination unit that determines whether a knock occurs on the basis of a knock index expressing a ratio of a difference between each frequency component and the learning value for the number of fuel injections relative to the background level.

Advantageous Effects of Invention

According to the present invention, the knock detection accuracy can be ensured irrespective of fuel injection conditions even when a period during which injection-valve noise occurs overlaps with a knock determination period. Other object, structure, and effect than the aforementioned ones will be made apparent by the description of an embodiment below.

DESCRIPTION OF EMBODIMENT

A structure and an operation of a knock detecting device according to one embodiment of the present invention will be described with reference to the drawings. In each drawing, the same part is denoted by the same reference sign.

Figure 1:
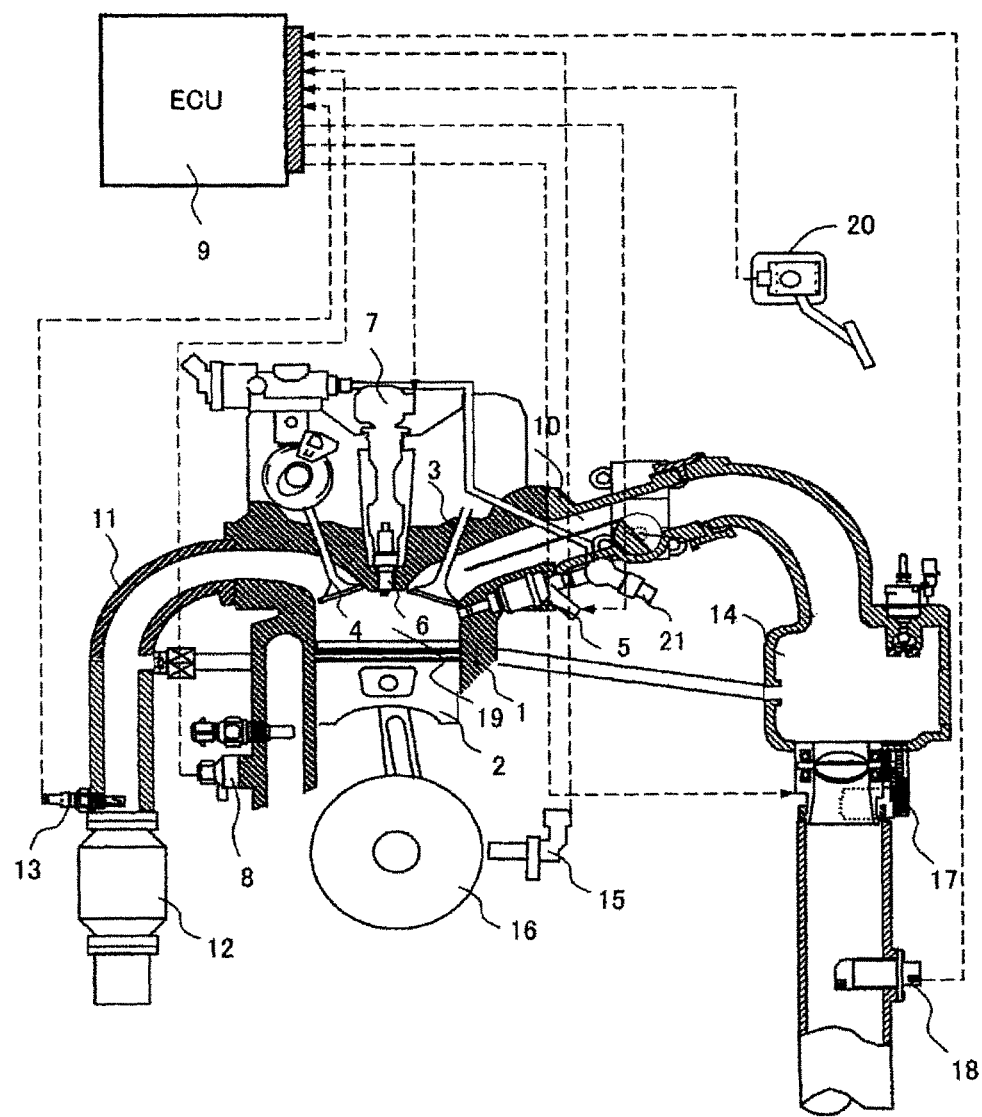
FIG. 1 is a fundamental structure diagram of a system including an engine control unit (knock detecting device) and an engine (spark-ignition internal combustion engine) according to one embodiment of the present invention.

First, a structure of the knock detecting device is described with reference to FIG. 1. FIG. 1 is a fundamental structure diagram of a system including an engine control unit 9 (knock detecting device) and an engine 1 (spark-ignition internal combustion engine) according to one embodiment of the present invention. In the present description, a direct-injection type spark-ignition internal combustion engine is used but the present invention is similarly applicable to a port injection type spark-ignition internal combustion engine or a dual-injection type spark-ignition internal combustion engine including both the direct-injection type and the port injection type.

As illustrated in FIG. 1, the engine 1 includes a piston 2, an intake valve 3, and an exhaust valve 4. The intake air goes through an air flow meter (AFM) 18 to enter a throttle valve 17, and is supplied to a combustion chamber 19 of the engine 1 from a collector 14, which corresponds to a branch part, through an intake pipe 10 and the intake valve 3. The fuel is injected and supplied from a fuel injection valve 5 to the combustion chamber 19 of the engine 1, and ignited by an ignition coil 7 and an ignition plug 6.

The exhaust gas after the combustion is exhausted to an exhaust pipe 11 through the exhaust valve 4. The exhaust pipe 11 is provided with a three-way catalyst 12 for cleaning the exhaust gas. To the engine control unit (ECU) 9, a signal of a crank angle sensor 15 of the engine 1, an air quantity signal of the AFM 18, a signal of an air-fuel ratio sensor 13 that detects the air-fuel ratio of the exhaust gas, and a signal of an accelerator opening of an accelerator opening sensor 20 are input, for example.

Based on the signal of the accelerator opening sensor 20, the engine control unit 9 calculates the torque required for the engine, determines the idling state, and so on, and calculates the intake air quantity necessary for the engine 1, and outputs the necessary opening signal to the throttle valve 17. The engine control unit 9 also outputs the fuel injection signal to the fuel injection valve 5, and outputs an ignition signal to the ignition plug 6.

A knock sensor 8 attached to the engine 1 detects the noise (knocking) occurring when the engine 1 experiences the abnormal combustion, and performs the feedback control of the ignition signal.

Figure 2:
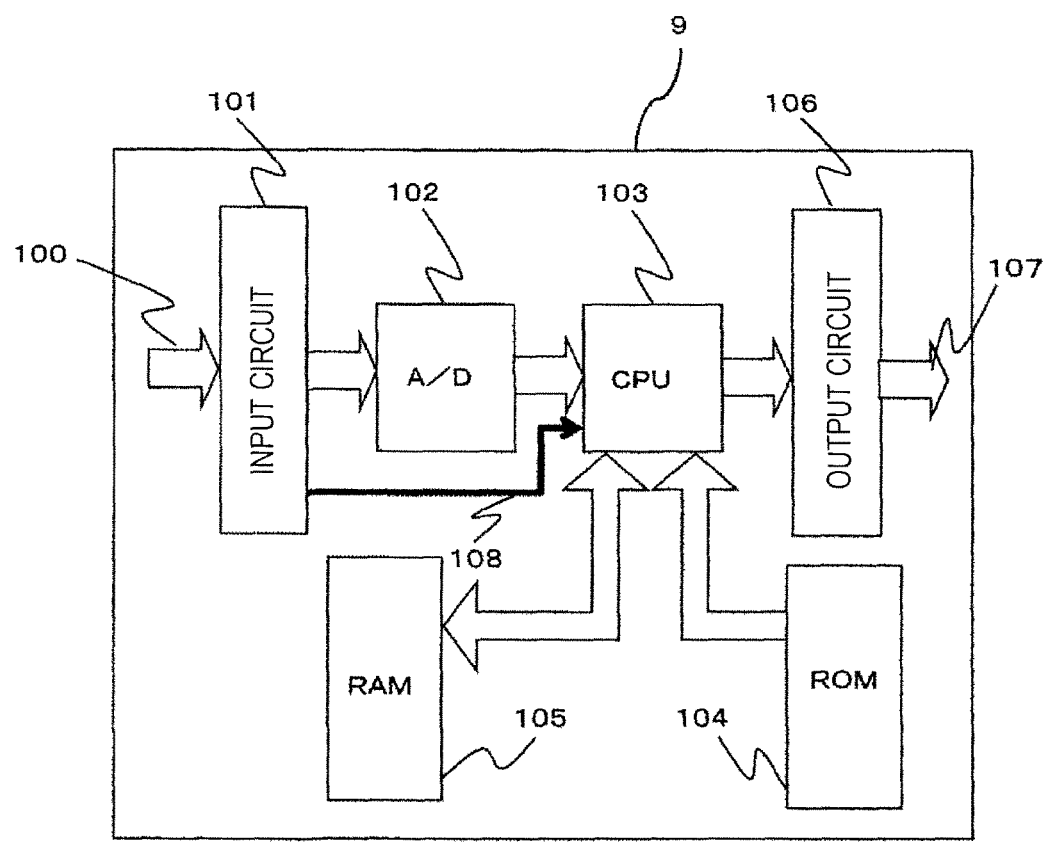
FIG. 2 is an internal structure diagram of the engine control unit illustrated in FIG. 1.

Next, an internal structure of the engine control unit 9 is described with reference to FIG. 2. FIG. 2 is an internal structure diagram of the engine control unit 9 illustrated in FIG. 1.

The engine control unit 9 includes a microcomputer including an input circuit 101, an A/D conversion unit 102, a central processing unit (CPU) 103, a ROM 104, a RAM 105, and an output circuit 106. The input circuit 101 is configured to, if an input signal 100 is an analog signal (for example, a signal from the AFM 18, the accelerator opening sensor 20, or the like), remove a noise component from the signal and output the obtained signal to the A/D conversion unit 102, for example.

The central processing unit 103 has functions of executing each control, diagnosis, or the like by taking in the A/D conversion result and executing a fuel injection control program or other control programs stored in a medium such as the ROM 104. Note that the calculation result and the A/D conversion result are temporarily stored in the RAM 105 and the calculation result is output as a control signal 107 through the output circuit 106 and used to control the fuel injection valve 5, the ignition coil 7, and the like.

Figure 3:
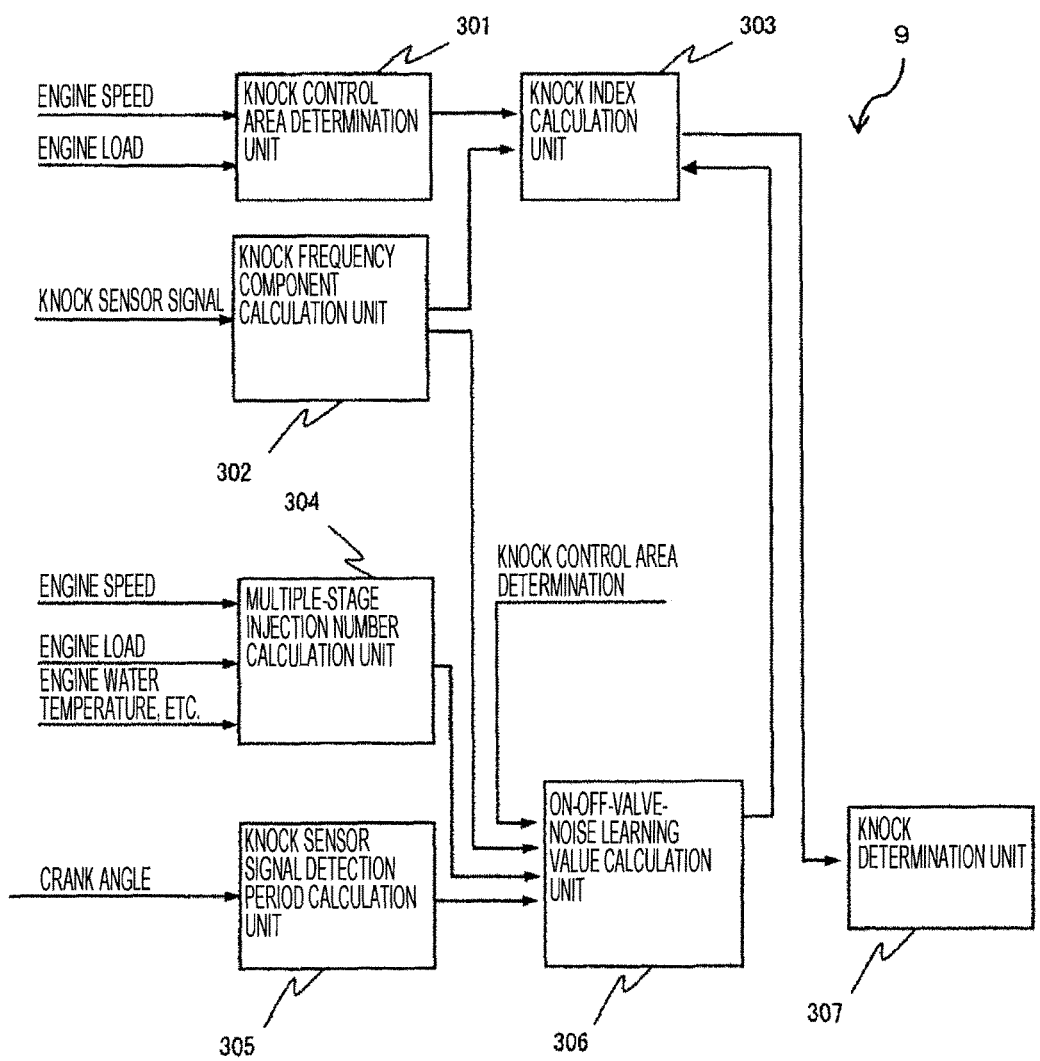
FIG. 3 is a control block diagram of the engine control unit illustrated in FIG. 1.

Next, the control of the engine control unit 9 is described with reference to FIG. 3. FIG. 3 is a control block diagram of the engine control unit 9 illustrated in FIG. 1.

A knock control area determination unit 301 determines whether the engine speed and the engine load value are within a knock control area. A knock frequency component calculation unit 302 calculates knock frequency components on the basis of a knock sensor signal. If the engine speed and the engine load value are determined as being within the knock control area, a knock index calculation unit 303 calculates a knock index on the basis of the knock frequency components and an on-off-valve-noise learning value that is calculated by an on-off-valve-noise learning value calculation unit 306.

A multiple-stage injection number calculation unit 304 calculates a multiple-stage injection number on the basis of parameters such as the engine speed, the engine load, and the engine water temperature. A knock sensor signal detection interval calculation unit 305 calculates a knock sensor signal detection interval on the basis of a signal of the crank angle sensor 15 input to the central processing unit 103.

If the engine speed and the engine load value are determined as being out of the knock control area, the on-off-valve-noise learning value calculation unit 306 calculates the on-off-valve-noise learning value for every multiple-stage injection number in the knock sensor signal detection interval.

A knock determination unit 307 determines whether a knock occurs on the basis of the knock index and the on-off-valve-noise learning value.

Figure 4:
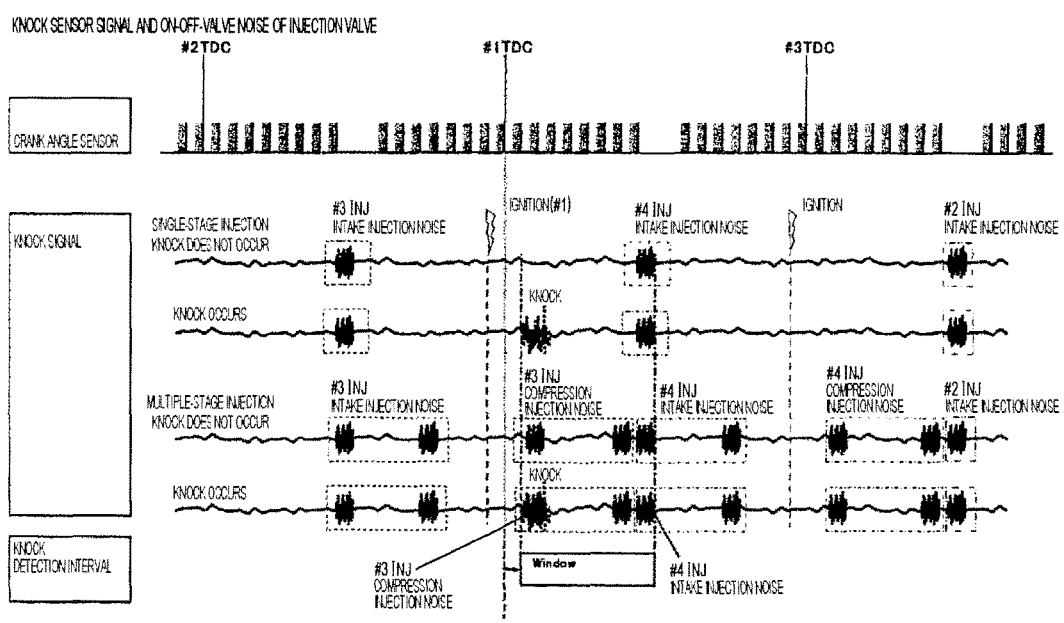
FIG. 4 is a diagram for describing the relation between knock sensor signals and on-off-valve noises of a fuel injection valve.

Next, the relation between the knock sensor signal and the on-off-valve noise of the fuel injection valve is described with reference to FIG. 4. FIG. 4 is a diagram for describing the relation between the knock sensor signals and the on-off-valve noises of the fuel injection valve. Note that FIG. 4 illustrates an example of an inline four-cylinder engine, in which #1 to #4 denote the cylinder numbers.

If the knock sensor is normal and knocking has occurred due to the abnormal combustion in the engine, a knock waveform appears in the knock sensor signal near the compression top dead center after the combustion.

On the other hand, during the engine rotation, the vibrations always occur in the knock sensor signals due to the reason other than the knocking. Specifically, the vibrations of the intake valve and the exhaust valve, the vibration due to the opening and closing of the fuel injection valve, and the like always occur.

For the knock detection, the knock control employs a knock sensor signal detection interval (window) based on the compression top dead center. Here, the knock sensor signal detection interval is set so that the knock occurring in the engine can be detected.

In the case of a single-stage injection (one injection), the on-off-valve noise of the fuel injection valve by the intake process injection of the fourth cylinder (#4) appears in the knock sensor signal detection interval (window) set after the ignition of the first cylinder (#1). If the single-stage injection (one injection) has continued, the on-off-valve noise of the fuel injection value remains at the same level, so that it is easy to separate the vibration that is caused by the knocking.

On the other hand, in the case of the multiple-stage injection, it is considered that the on-off-valve noise of the fuel injection valve by the compression process injection of the third cylinder (#3) appears in addition to the on-off-valve noise of the fuel injection valve by the intake process injection of the fourth cylinder (#4) in the knock sensor signal detection interval set after the ignition of the first cylinder (#1).

Depending on the set number of multiple-stage injections or operation conditions, the number of multiple-stage injections in the knock sensor signal detection interval varies and as a result, the on-off-valve noise of the fuel injection valve also changes. Therefore, in the case where the number of multiple-stage injections changes transitionally, even if the knocking actually occurs, the vibration due to the knocking is hidden in the on-off-valve noise of the fuel injection valve. In this case, the knock detection is difficult.

In the present embodiment, in order to ensure the knock detection accuracy, the on-off-valve noise of the fuel injection valve is learned and used in the knock determination. The on-off-valve-noise learning value of the fuel injection valve is set for every number of fuel injections, every cylinder, and every frequency, and is controlled to improve the knock detection accuracy.

This enables the appropriate knock detection even when the on-off-valve noise of the fuel injection valve in the knock sensor signal detection interval changes depending on the single-stage injection (one injection) or the multiple-stage injection.

Figure 5:
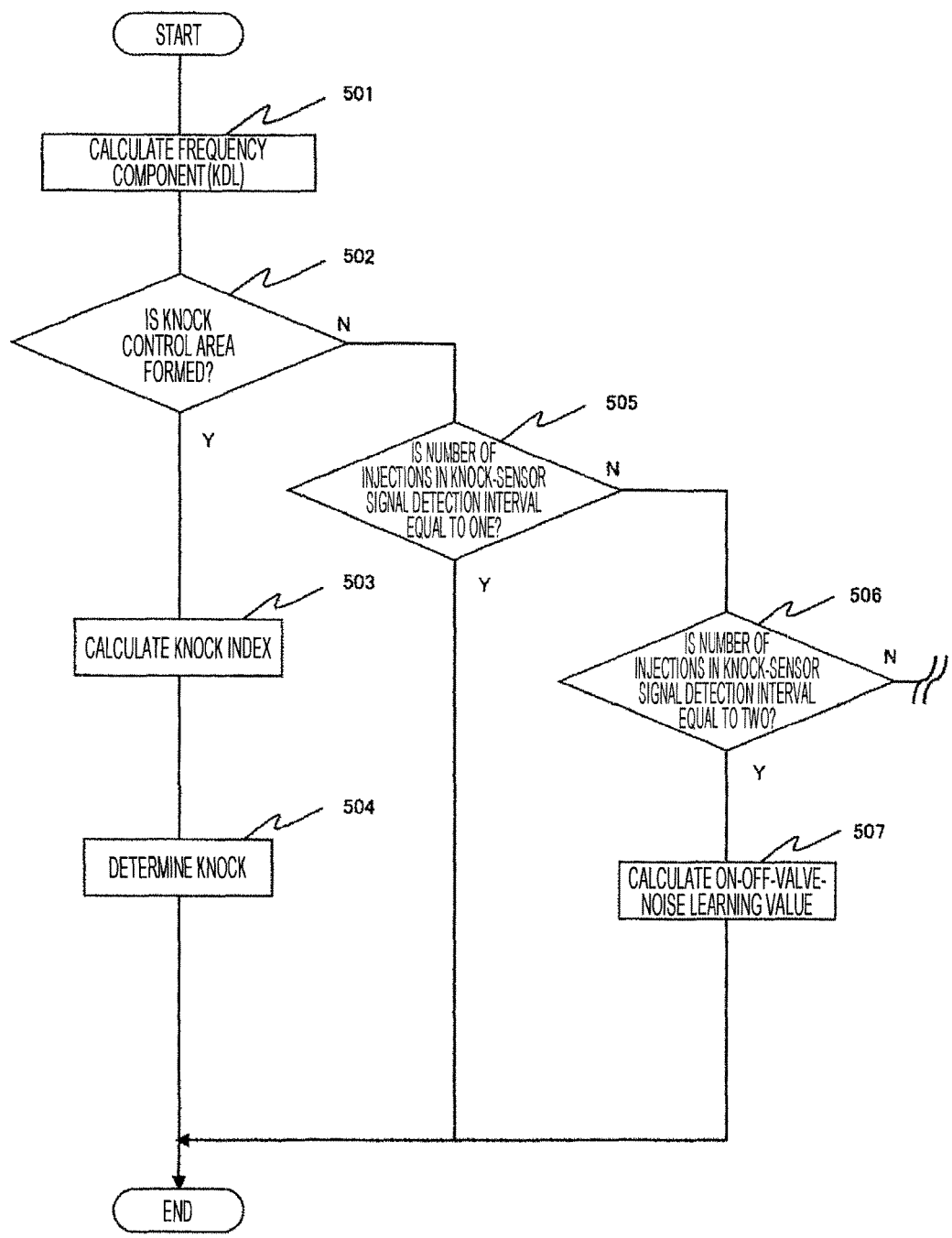
FIG. 5 is a flowchart illustrating a learning method for the on-off-valve noise in the normal learning.

Next, a first learning method for the on-off-valve noise of the fuel injection valve 5 is described with reference to FIG. 5. FIG. 5 is a flowchart illustrating a learning method for the on-off-valve noise in the normal learning.

As illustrated in FIG. 5, upon the start of this routine, first, the knock sensor signal is subjected to frequency analysis, so that the ECU 9 calculates the knock frequency components (KDL) in step 501. For example, the ECU 9 calculates knock frequency components $KDL_i$ (i=1, 2, . . . , n) expressing the frequency of a sine wave constituting the knock sensor signal using the Fourier transform. One example of $KDL_i$, is a value with 7 to 14 kHz.

Here, the ECU 9 functions as a calculation unit that subjects the signals output from the knock sensor 8, which detects the vibrations of the internal combustion engine, to frequency analysis to calculate the frequency components $KDL_i$.

After that, in step 502, the ECU 9 determines whether the knock control area is formed. For example, the ECU 9 determines whether the measurement values of the engine speed and the engine load are within the knock control area expressing the area where the control to suppress the knock is executed. The ECU 9 determines that the knock control area is formed if the measurement values of the engine speed and the engine load are in the knock control area, and determines that the knock control area is not formed if the measurement values of the engine speed and the engine load are out of the knock control area. Thus, the on-off-valve noise learning of the fuel injection valve can be completed before the knock control is started. Moreover, since the knock control area is not formed, the on-off-valve noise learning can be performed under the condition that the knock does not occur.

In step 502, if it has been determined that the knock control area is formed, the process advances to step 503 where the ECU 9 calculates the knock index.

For example, the ECU 9 calculates the knock index $KS_i$ (i=1, 2, . . . , n) from the following Formulae (1) and (2).

$$KS_i = (KDL_i - \alpha_i)/BGL_i \qquad (1)$$

$$BGL_i = MBGL \times KDL_i + (1-MBGL) \times \text{the previous } BGL_i \qquad (2)$$

Here, $KDL_i$ is the knock frequency components calculated in step 501. $BGL_i$ is the background level and corresponds to, for example, the weight average of the knock frequency components $KDL_i$ and the background level $BGL_i$ in the previous frequency analysis. MBGL is the weighting coefficient, and $\alpha_i$ is the learning value of the on-off-valve noise calculated in step 507 to be described below.

The ECU 9 functions as a calculation unit that calculates the background level $BGL_i$ expressing the average of the frequency components $KDL_i$.

In step 504, the ECU 9 determines whether a knock occurs or not.

For example, the ECU 9 determines that a knock occurs when all the knock indices $KS_i$ or some knock indices $KS_i$, are more than or equal to a predetermined threshold $TH_i$, and determines that a knock does not occur when all the knock indices $KS_i$ or any one of knock indices $KS_i$ is less than the predetermined threshold $TH_i$.

Here, the ECU 9 functions as a knock determination unit that determines whether a knock occurs or not on the basis of the knock index $KS_i$ expressing the ratio of the difference between the frequency components $KDL_i$ and the learning value $\alpha_i$ for the fuel injection number relative to the background level.

If it has been determined in step 502 that the knock control area is not formed, the ECU 9 determines in step 505 whether the number of fuel injections in the knock sensor signal detection interval is one or not. If it has been determined in step 505 that the number of fuel injections in the knock sensor signal detection interval is one, the ECU 9 does not calculate the on-off-valve-noise learning value of the fuel injection valve, and the process ends.

On the other hand, if it has been determined in step 505 that the number of fuel injections in the knock sensor signal detection interval is two or more, whether the number of fuel injections in the knock sensor signal detection interval is two or not is determined in step 506. If it has been determined in step 506 that the number of fuel injections in the knock sensor signal detection interval is two, the process advances to step 507, and based on the knock frequency components (KDL) calculated in step 501, the on-off-valve-noise learning value in the two injections is calculated.

The present flowchart illustrates at most two injections but this process similarly applies when the number of fuel injections in the knock sensor signal detection interval is three, four, or five, and the on-off-valve-noise learning value for every fuel injection number is calculated.

For example, the ECU 9 calculates the frequency components $KDL_i^1$ (i=1, 2, . . . , n) by subjecting to the frequency analysis the knock sensor signals when the number of fuel injections in the knock sensor signal detection interval is one, and calculates the frequency components $KDL_i^p$ (i=1, 2, . . . , n) by subjecting to the frequency analysis the knock sensor signals when the number of fuel injections in the knock sensor signal detection interval is p (p: a natural number of 2 or more).

In this case, the ECU 9 calculates the on-off-valve-noise learning value $\alpha_i$ from the following Formula (4).

$$\alpha_i = KDL_i^p - KDL_i^1 \qquad (3)$$

By subjecting the knock sensor signals to the frequency analysis, the on-off-valve noise of the fuel injection valve and the vibration due to the knock can be separated and the more accurate knock detection becomes possible. Moreover, the on-off-valve noise learning of the fuel injection valve is performed in the normal control; therefore, the on-off-valve-noise learning value can be calculated without the deterioration in exhaust performance or the rebound for the operability.

Here, the ECU 9 stores the number of fuel injections expressing the number of times of injecting fuel in a predetermined period (knock sensor signal detection interval) in one combustion cycle and a learning value $\alpha_i$, expressing the amount of correcting the frequency components in a memory (storage unit) while associating the both.

The ECU 9 functions as an update unit that calculates the learning value $\alpha_i$ on the basis of a first signal output from the knock sensor 8 when the number of fuel injections is N (N: a natural number of 2 or more), and a second signal output from the knock sensor 8 when the number of fuel injections is 1, and that updates the learning value $\alpha_i$ for the N number of injection stages stored in the storage unit to the calculated learning value. The ECU 9 (update unit) may calculate the learning value $\alpha_i$ from the frequency components of the difference between the first signal and the second signal.

As described above, in the present embodiment, the knock detection accuracy can be ensured irrespective of fuel injection conditions even when a period during which injection-valve noise occurs overlaps with a knock determination period.

That is to say, the vibrations from the opening and closing of the fuel injection valve are learned in accordance with the number of injections in the knock sensor signal detection interval, and the on-off-valve-noise learning value can be reflected in the knock determination. Therefore, it can be prevented that the state in which the number of injections in the knock sensor signal detection interval is increased by the change in operation condition of the internal combustion engine and the on-off-valve noise of the fuel injection valve is increased is misjudged as the knock occurrence.

Moreover, even in the transitional change in which the on-off-valve noise of the fuel injection valve goes out of the knock sensor signal detection interval or enters the knock sensor signal detection interval by the change of the set number of injections or the change of the fuel injection time, the on-off-valve-noise learning value of the fuel injection valve is calculated for every number of fuel injections. This enables the appropriate knock determination.

First Modified Example

The distance between the fuel injection valve and the knock sensor attachment position is different for every cylinder. Therefore, even if the on-off-valve noise has occurred at the same level, the on-off-valve noise of the fuel injection valve detected by the knock sensor is different for every cylinder.

In view of this, the number of fuel injections and the learning value $\alpha_i$ may be stored while being associated with each other for every cylinder of the internal combustion engine, and the ECU 9 (knock determination unit) may determine whether a knock occurs on the basis of the knock index of every cylinder of the internal combustion engine.

According to the present modified example, the knock detection accuracy can be ensured irrespective of the cylinder by accurately knowing the on-off-valve noise of the fuel injection valve that is different depending on the cylinder.

Second Modified Example

Figure 6:
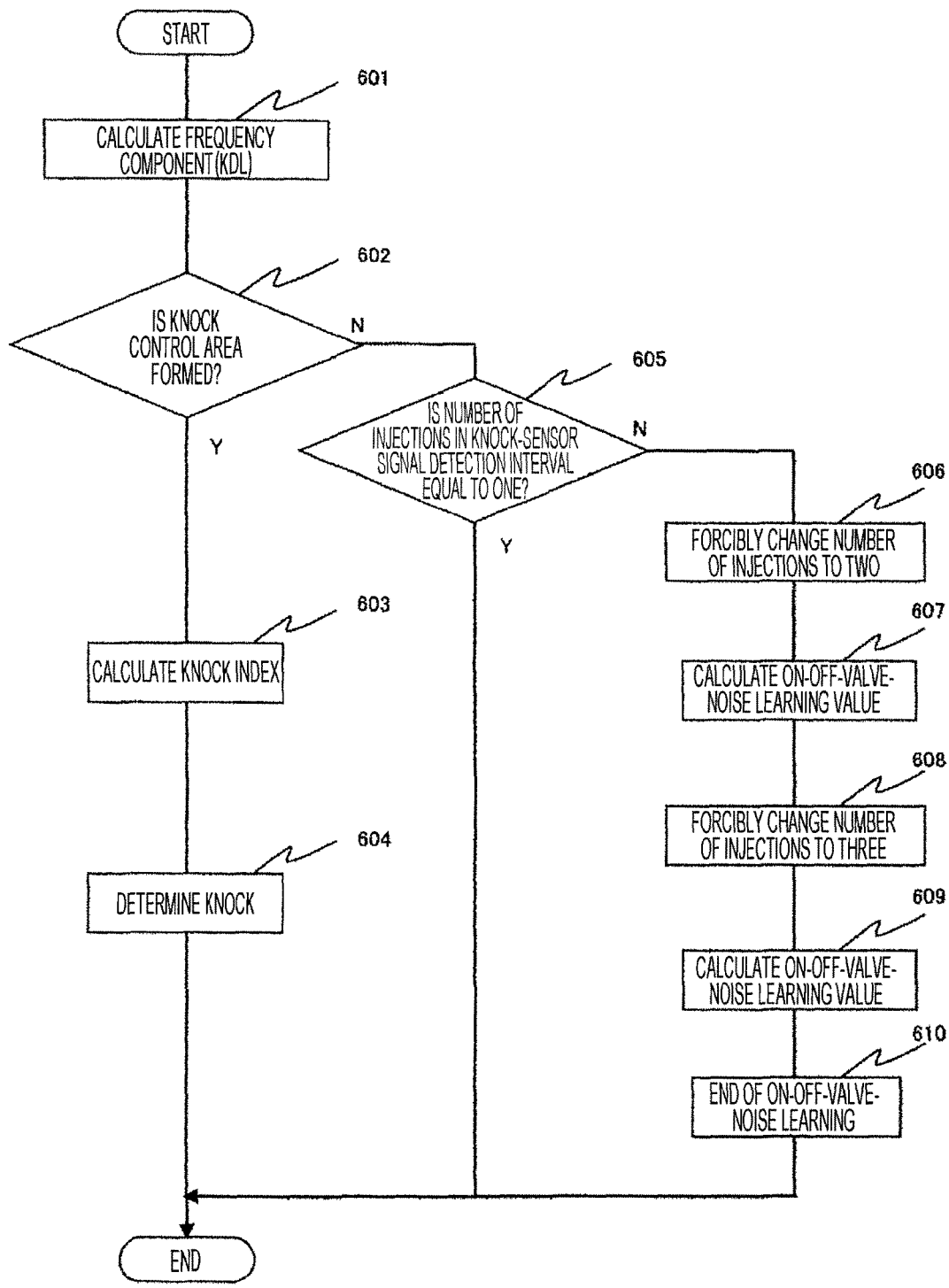
FIG. 6 is a flowchart illustrating a learning method for the on-off-valve noise in the forced learning.

Next, a second learning method will be described with reference to FIG. 6. FIG. 6 is a flowchart illustrating a learning method for the on-off-valve noise in the forced learning. FIG. 6 is different from FIG. 5 in the process from step 606 to step 610.

The ECU 9 performs the process from steps 601 to 605 in a manner similar to the process from steps 501 to 505 in FIG. 5.

If it has been determined in step 605 that the number of fuel injections in the knock sensor signal detection interval is two or more, the ECU 9 changes the number of fuel injections forcibly and calculates the on-off-valve-noise learning value. Specifically, the process advances to step 606 and the ECU 9 forcibly changes the number of fuel injections in the knock sensor signal detection interval to two.

In step 607, the ECU 9 calculates the on-off-valve-noise learning value in the two injections, on the basis of the knock frequency components (KDL) calculated in step 601.

The process advances to step 608 where the ECU 9 forcibly changes the number of fuel injections in the knock sensor signal detection interval to three.

In step 609, the ECU 9 calculates the on-off-valve-noise learning value in the three injections on the basis of the knock frequency components (KDL) calculated in step 601.

In step 610, if the calculation of the on-off-valve-noise learning value by the forced change of the number of fuel injections in the knock sensor signal detection interval ends, the forced learning by the change of the number of fuel injections ends.

The present flowchart illustrates at most three injections but this process similarly applies when the number of fuel injections in the knock sensor signal detection interval is forcibly increased to four or five, and the on-off-valve-noise learning value for every number of fuel injections is calculated.

Here, the ECU 9 functions as a change unit that forcibly changes the number of fuel injections to N irrespective of the operation state of the internal combustion engine when the number of fuel injections is one.

In the present modified example, the on-off-valve noise learning of the fuel injection valve is performed by forcibly changing the number of injections in the multiple-stage injection and therefore, the calculation of the on-off-valve-noise learning value can be completed before the knock control is started.

Third Modified Example

In the typical multiple-stage injection, the required amount of injection is divided and the fuel injection is performed in the divided amount. Therefore, the amount of one fuel injection is small and the fuel injection is performed in a half-lift state in which the fuel injection valve starts to close before the valve opening operation is completed. In the half-lift state, the valve closing is started before the valve opening operation is completed; therefore, the collision to the stopper on the valve opening side is prevented and the noise in the valve opening does not occur.

In view of the above, the ECU 9 may determine whether the fuel injection valve is in the half-lift state or not. The ECU (update unit) corrects the number of fuel injections by subtracting the number of times when the fuel injection valve is in the half-lift state from the number of fuel injections if the number of fuel injections is N.

In the present modified example, when the on-off-valve-noise learning value of the fuel injection valve is calculated, the fuel injection with the small valve opening noise can be excluded. Therefore, the more accurate on-off-valve-noise learning value can be calculated.

Note that if it has been determined that the fuel injection valve is in the half-lift state, the ECU 9 (update unit) may not update the learning value $\alpha_i$. In this case, the update of the learning value when the valve opening noise is small like in the half-lift state can be masked; therefore, the accurate on-off-valve-noise learning value can be calculated.

Fourth Modified Example

In regard to the fuel pressure, the intensity of the on-off-valve noise of the fuel injection valve is different depending on whether the fuel pressure is low pressure or high pressure. Specifically, in the case where the fuel pressure is low pressure, when the fuel injection valve is opened, the reaction force by the fluid (fuel) is small so that the valve opening operation is fast and the collision force to the stopper on the valve opening side is high. Therefore, the valve opening noise is large. When the fuel injection valve is closed, the pressure on the fuel injection valve is small so that the valve closing operation is slow and the collision force when the valve body returns to the closed position is low. Therefore, the valve closing noise is small.

On the other hand, in the case where the fuel pressure is high pressure, when the fuel injection valve is opened, the reaction force by the fluid (fuel) is large so that the valve opening operation is slow and the collision force to the stopper on the valve opening side is low. Therefore, the valve opening noise is small. When the fuel injection valve is closed, the pressure on the fuel injection valve is large so that the valve closing operation is fast and the collision force when the valve body returns to the closed position is high. Therefore, the valve closing noise is large.

In view of this, the ECU 9 (update unit) may calculate the learning value $\alpha_i$ from at least one of the valve opening noise and the valve closing noise of the fuel injection valve.

In the present modified example, the on-off-valve noise learning is performed based on the characteristics of the noise intensity of the valve opening and the valve closing that is different depending on the conditions. Therefore, the on-off-valve-noise learning value can be calculated with high accuracy.

Fifth Modified Example

The ECU 9 may correct the learning value ($\alpha_i$ in accordance with the fuel pressure measured with a fuel pressure sensor 21.

In the present modified example, the change in the intensity of the on-off-valve noise of the fuel injection valve along with the change in fuel pressure can be corrected. Thus, in the occurrence of the change in fuel pressure, the knock detection accuracy can be ensured.

One embodiment of the present invention has been described in detail but the present invention is not limited to the above embodiment. Various changes can be made in the design without departing from the spirit of the present invention described in the scope of claims.

The embodiment described above is to clarify the present invention and the present invention is not limited to the invention including all the structures described above. Apart of the structures of a certain embodiment may be replaced by a structure of another embodiment, or a structure of a certain embodiment may be added to a structure of another embodiment. In regard to apart of the structure of each embodiment, another structure may be added, deleted, or replaced.

In the above embodiment, the knock frequency components are calculated using the Fourier transform in the analysis of the frequency but another transform such as Walsh transform may be employed.

In the above embodiment, the background level $BGL_i$ is the weight average of the knock frequency components $KDL_i$ and the background level $BGL_i$ in previous frequency analysis but may be another average (moderated value).

REFERENCE SIGNS LIST

1 engine
2 piston
3 intake valve
4 exhaust valve
5 fuel injection valve
6 ignition plug
7 ignition coil
8 knock sensor
9 ECU (engine control unit)
10 intake pipe
11 exhaust pipe
12 three-way catalyst
13 air-fuel ratio sensor
14 collector
15 crank angle sensor
16 signal plate
17 throttle valve
18 AFM
19 combustion chamber
20 accelerator opening sensor
21 fuel pressure sensor

The invention claimed is:

1. A knock detecting device, comprising:
a processor configured to:
calculate frequency components by subjecting signals output from a knock sensor, which detects vibrations of an internal combustion engine, to frequency analysis; and
calculate a background level expressing an average of the frequency components; and
a memory storing the number of fuel injections expressing the number of times of injecting fuel in a predetermined period in one combustion cycle and a learning value expressing a correction amount of the frequency components while associating both the number of fuel injections and the learning value;
wherein the processor detects that a knock occurs in the internal combustion engine responsive to a knock index being greater than a predetermined threshold, wherein the knock index indicates a ratio of a difference between each frequency component and the learning value for the number of fuel injections to the background level expressing the average of the frequency components.

2. The knock detecting device according to claim 1, wherein
the memory stores the number of fuel injections and the learning value while associating the both for every cylinder of the internal combustion engine, and
the processor is further configured to determine whether the knock occurs on the basis of the knock index of every cylinder of the internal combustion engine.

3. The knock detecting device according to claim 1, wherein
memory stores the number of fuel injections and the learning value while associating the both for every frequency component, and
the processor is further configured to determine whether the knock occurs on the basis of the knock index of every frequency component.

4. The knock detecting device according to claim 1, wherein the processor is further configured to calculate the learning value on the basis of a first signal output from the knock sensor when the number of fuel injections is N, and a second signal output from the knock sensor when the number of fuel injections is 1, and that updates the learning value for the N number of fuel injection stages stored in the storage unit to the calculated learning value, wherein N is a natural number and is greater than or equal to 2.

5. The knock detecting device according to claim 4, wherein the processor is further configured to calculate the learning value from a difference between the frequency components of the first signal and the frequency components of the second signal.

6. The knock detecting device according to claim 4, wherein the processor is further configured to calculate the learning value from the frequency components of a difference between the first signal and the second signal.

7. A knock detecting device, comprising:
a processor configured to:
  calculate frequency components by subjecting signals output from a knock sensor, which detects vibrations of an internal combustion engine, to frequency analysis; and
  calculate a background level expressing an average of the frequency components; and
a memory storing the number of fuel injections expressing the number of times of injecting fuel in a predetermined period in one combustion cycle and a learning value expressing a correction amount of the frequency components while associating both the number of fuel injections and the learning value;
wherein the processor is further configured to:
  determine whether a knock occurs based on a knock index expressing a ratio of a difference between each frequency component and the learning value for the number of fuel injections to the background level expressing the average of the frequency components, and
  forcibly change the number of fuel injections to N irrespective of an operation state of the internal combustion engine when the number of fuel injections is one, wherein N is a natural number and is greater than or equal to 2.

8. The knock detecting device according to claim 4, wherein the processor is further configured to determine whether the fuel injection valve is in a half-lift state or not, and correct the number of fuel injections by subtracting the number of times when the fuel injection valve is in the half-lift state from the number of fuel injections if the number of fuel injections is N.

9. The knock detecting device according to claim 4, wherein the processor is further configured to calculate the learning value from at least one of a valve opening noise and a valve closing noise of the fuel injection valve.

10. The knock detecting device according to claim 4, wherein the processor is further configured to determine whether the fuel injection valve is in a half-lift state or not, wherein the learning value is not updated if the fuel injection valve is determined to be in the half-lift state.

11. The knock detecting device according to claim 4, wherein the processor is further configured to determine whether a rotation speed and a load of the internal combustion engine are within a knock control area expressing an area where control is executed to suppress a knock, wherein the learning value is updated if the rotation speed and the load of the internal combustion engine are out of the knock control area.

12. The knock detecting device according to claim 4, wherein the processor is further configured to correct the learning value in accordance with a fuel pressure.

\* \* \* \* \*